United States Patent [19]

Mikami et al.

[11] Patent Number: 4,795,589
[45] Date of Patent: Jan. 3, 1989

[54] SILICATE PHOSPHOR

[75] Inventors: Tomoki Mikami; Yukio Tokunaga; Mitsuharu Natsugari; Susumi Omatoi; Shinji Yokota, all of Odawara, Japan

[73] Assignee: Kasei Optonix, Ltd., Tokyo, Japan

[21] Appl. No.: 66,495

[22] Filed: Jun. 26, 1987

[30] Foreign Application Priority Data

Jun. 26, 1986 [JP] Japan ................... 61-148035
Jul. 24, 1986 [JP] Japan ................... 61-172881

[51] Int. Cl.$^4$ .............................................. C09K 11/59
[52] U.S. Cl. ........................ 252/301.6 F; 252/301.4 F
[58] Field of Search ................... 252/301.4 F, 301.6 F

[56] References Cited

U.S. PATENT DOCUMENTS

| | | | |
|---|---|---|---|
| 2,169,046 | 8/1939 | Headrick | 252/301.6 F |
| 2,241,939 | 5/1941 | Aschermann et al. | 252/301.6 F |
| 2,545,880 | 3/1951 | Froelich | 252/301.4 F |
| 4,231,892 | 11/1980 | Chang et al. | 252/301.6 F |

FOREIGN PATENT DOCUMENTS 0015382 9/1980 European Pat. Off. .

Primary Examiner—Jack Copper
Attorney, Agent, or Firm—Oblon, Fisher, Spivak, McClelland & Maier

[57] ABSTRACT

A silicate phosphor comprising manganese as an activator, a trivalent element and a pentavalent element, wherein said trivalent element is at least one element selected from the group consisting of boron and indium, said pentavalent element is at least one element selected from the group consisting of arsenic, antimony and bismuth, the content of the trivalent element is from $1 \times 10^{-4}$ to $2 \times 10^{-2}$ gram-atom/mol, the content of the pentavalent element is not more than $3 \times 10^{-3}$ gram-atom/mol, and the molar ratio of the trivalent element to the pentavalent element (trivalent element/pentavalent element) is at least 1.5.

11 Claims, 8 Drawing Sheets

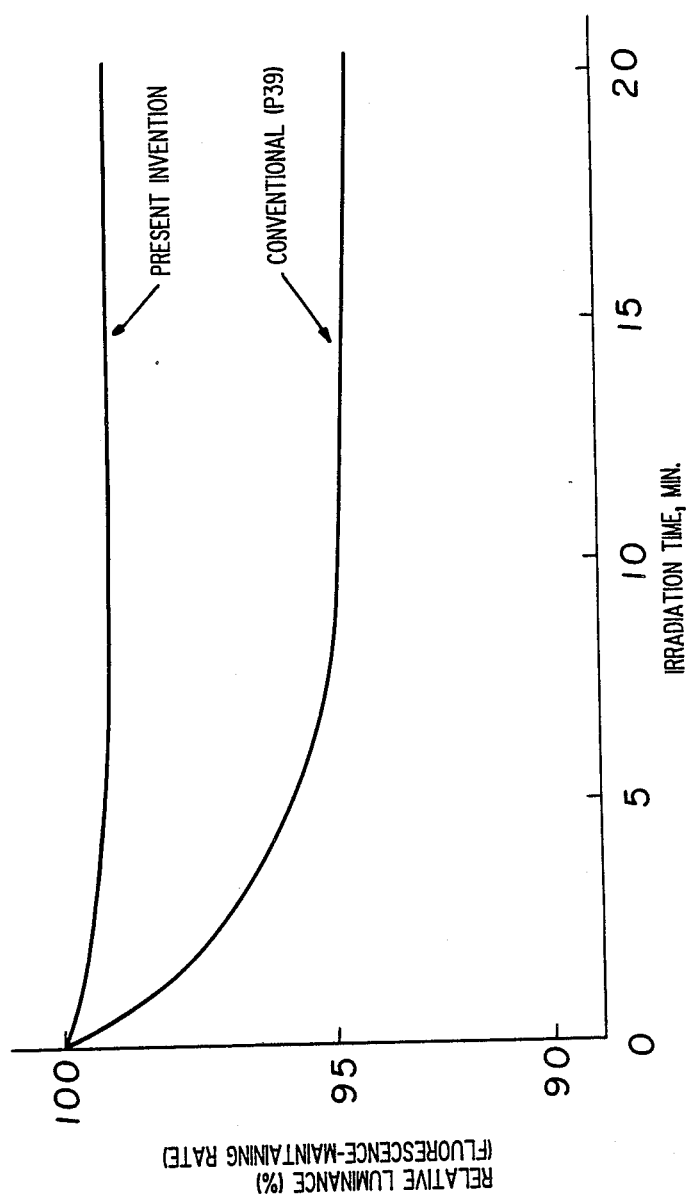

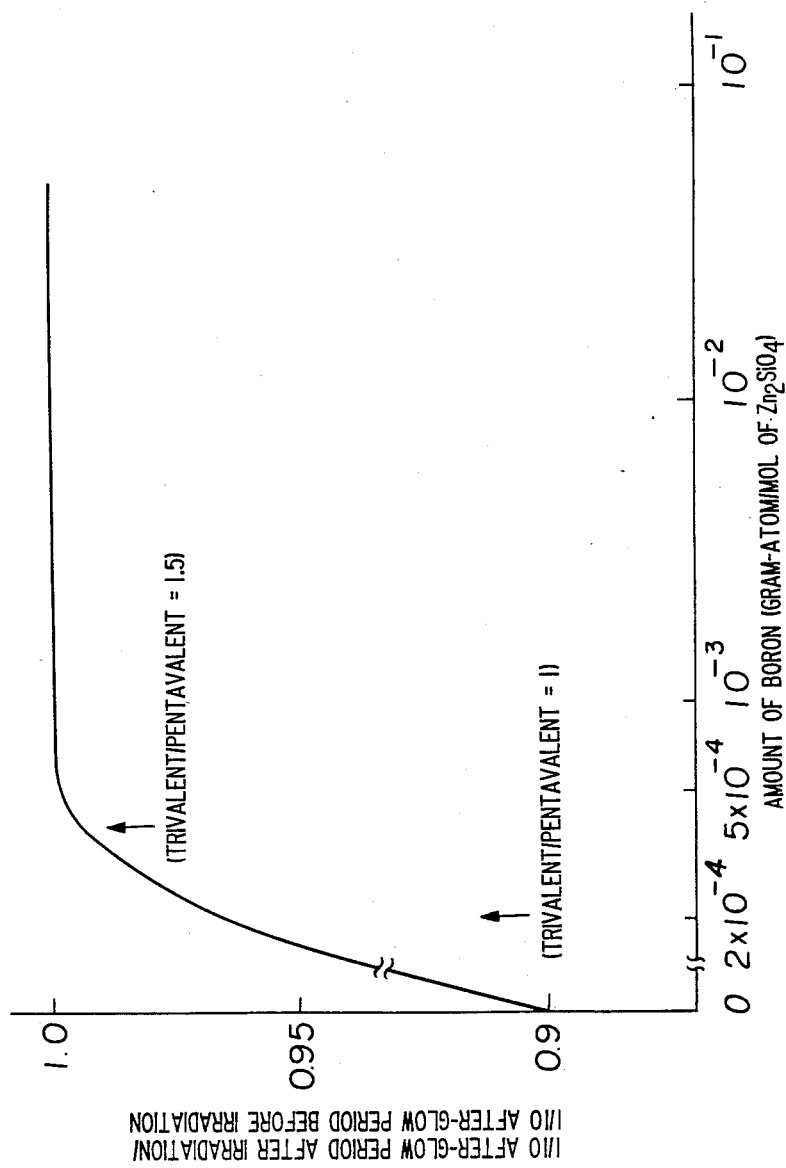

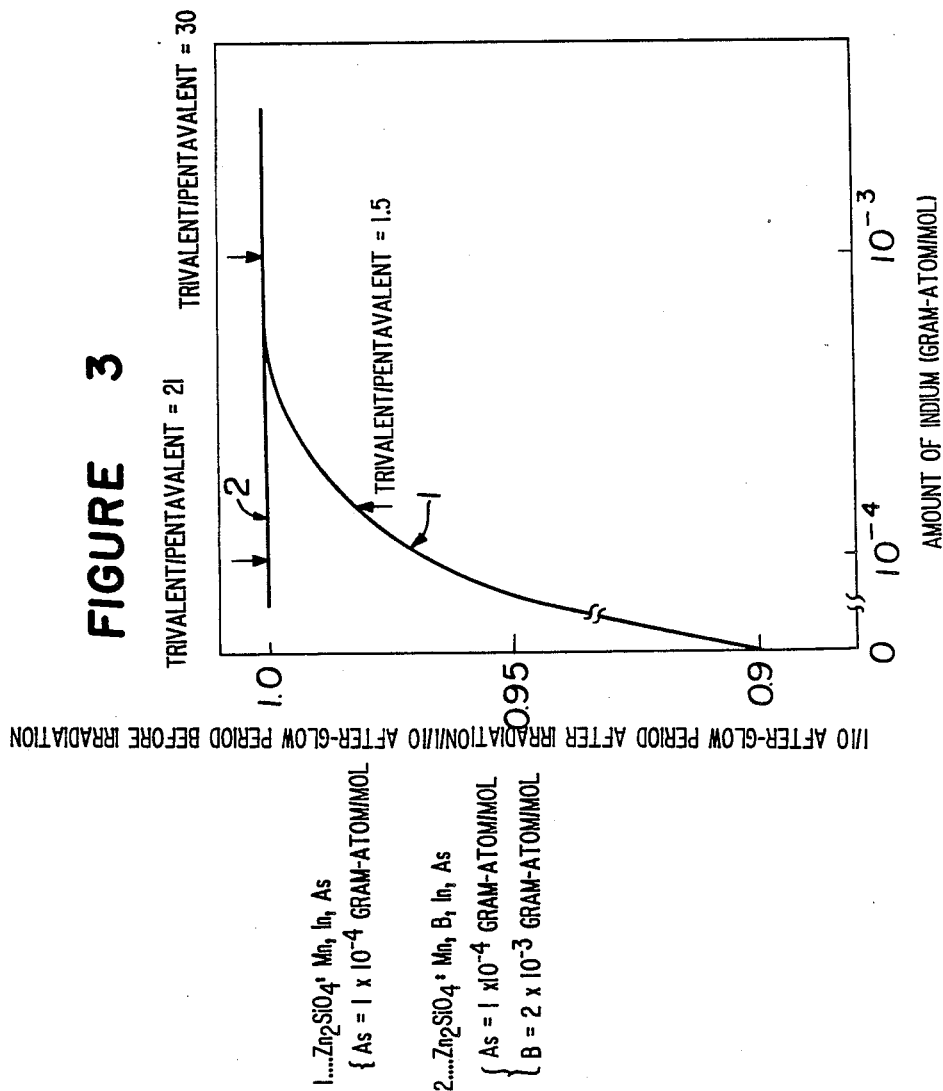

SILICATE PHOSPHOR

The present invention relates to a silicate phosphor containing manganese as an activator. More particularly, the present invention relates to a silicate phosphor wherein specific trivalent and pentavalent elements are incorporated in a specific ratio to reduce the initia degradation in luminance and after glow.

In recent years, it has been desired to use a cathode ray tube having high resolution for a terminal display unit of a computer system for displaying fine characters and figures, or for a display unit of an aircraft control system. In many cases, a phosphor having a long after-glow characteristic is used for a fluorescent screen ofssuch a high resolution cathode ray tube. In general, it is necessary for the phosphor constituting such a fluorescent screen to exhibit an after-glow period of from a few tens to several tens times longer than the after-glow period of the short after-glow phosphor which constitutes the fluorescent screen of an ordinary cathode ray tube. The term "after-glow period" used in this specification means the period of time required for the emission luminance to decrease to 10% of the emission luminance under excitation after the excitation of the phosphor is stopped, i.e. a "1/10 after-glow period".

As green emitting zinc silicate phosphors with long after-glow, there have been known a manganese and arsenic-activated zinc silicate phosphor (P39 phosphor) and a manganese-activated zinc silicate phosphor (P1 phosphor). Particularly, P39 phosphor is used practically in a large amount.

However, as the phosphor is used for various applications, many drawbacks have been found, for instance, in the degradation of the luminance or after-glow, or in the screening properties. It has been strongly desired to overcome such drawbacks. Various compositions have been proposed, for instance, in U.S. Pat. No. 4,231,892, Japanese Unexamined Patent Pullication No. 151322/1983 and U.S. Pat. No. 4,551,397.

However, it is common that a display tube prepared by using a silicate phosphor containing manganese as an activator, is subjected to an initial adjustment such as a linearity adjustment, after the production, whereby the same pattern is displayed on the tube for a period of a few hours to a few tens hours.

A fluorescent screen wherein a conventional silicate phosphor is used, has a drawback such that the portion subjected to electron beam irradiation for the abov display has a shorter after-glow (initial after-glow degradation) and a lower luminance (initial luminance degradation) than the portion not subjected to electron beam irradiation. This makes the initial adjustment of the display tube cumbersome, and a number of cathode ray tubes have to be subjected to aging for long hours, and yet the subsequent degradation is hardly predictable Thus, there have been various problems such that circuit setting for such products is difficult, the pattern used for the initial adjustment remains on the image due to the luminance degradation, and flickering is likely to result due to a partial after-glow degradation.

It is an object of the present invention to provide a silicate phosphor containing manganese as an activator, wherein the initial after-glow degradation and initial luminance degradation under excitation by electron beams are substantially reduced.

The present inventors have conducted various studies on silicate phosphors to accomplish the above object, and as a result, have found that the above-mentioned degradation can be substantially reduced when certain specific trivalent and pentavalent elements are incorporated in a certain specific molar ratio to a silicate phosphor containing manganese as an activator. The present invention has been accomplished on the basis of this discovery.

U.S. Pat. No. 4,231,892 discloses P39 phosphor containing the trivalent and pentavalent elements in equimolar amounts. The present inventors have found that the above-mentioned problems can be solved with a ratio substantially different from the disclosed ratio.

The silicate phosphor of the present invention comprises manganese as an activator, a trivalent element and a pentavalent element, and is characterized in that said trivalent element is at least one element selected from the group consisting of boron and indium, said pentavalent element is at least one element selected from the group consisting of arsenic, antimony and bismuth, the content of the trivalent element is from $1 \times 10^{-4}$ to $2 \times 10^{-2}$ gram-atom/mol, the content of the pentavalent element is not more than $3 \times 10^{-3}$ gram-atom/mol, and the molar ratio of the trivalent element to the pentavalent element (trivalent element/pentavalent element) is at least 1.5.

The most typical silicate phosphor containing manganese as an activator, is a manganese-activated zinc silicate phosphor. However, the silicate phosphor further includes bivalent metal cation silicate phosphors such as a manganese-activated magnesium silicate phosphor and a manganese and lead-activated calcium silicate phosphor.

In the accompanying drawings:

FIG. 1 is a graph showing the luminance degradation characteristics of the zinc silicate phosphor of the present invention as compared with those of the conventional phosphor.

FIG. 2 is a graph showing the relation between the initial after-glow degradation characteristics of the zinc silicate phosphor, and the boron content and the molar ratio of the trivalent element to the pentavalent element, when the arsenic content is constant.

FIG. 3 is a graph showing the relation between the initial after-glow degradation characteristics, and the indium content when the arsenic content or the arsenic and boron contents are constant.

Figure 4A:
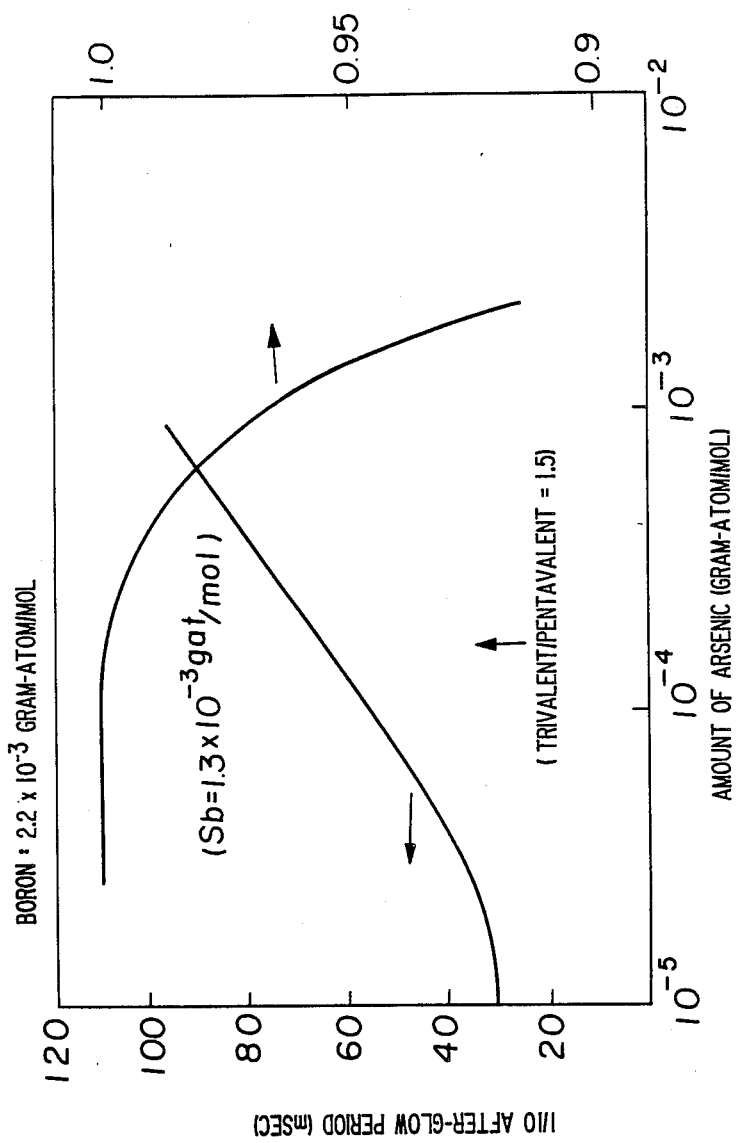
FIG. 4A is a graph showing the relation between the arsenic content and the molar ratio of the trivalent element to the pentavalent element, and the 1/10 after-glow period and the after-glow degradation characteristics, when the boron and antimony contents are constant.

Now, the present invention will be described in detail with referenc to a process for producing the most typical manganese-activated zinc silicate phosphor.

Firstly, as the phosphor raw material, there may be employed (i) zinc oxide (ZnO) or a zinc compound such as a carbonate or oxalate, which is capable of being readily converted to ZnO at a high temperature, (ii) silicon dioxide ($SiO_2$) or a silicon compound such as ethyl silicate or silicic acid, which is capable of being readily converted to $SiO_2$ at a high temperature, (iii) manganese oxide ($MnO_2$) or a manganese compound such as metal manganese, a carbonate, a halide, a nitrate or a sulfate, which is capable of being converted to manganese oxide at a high temperature, (iv) indium and boron oxides, or indium and boron compounds which are capable of being readily converted to indium and boron oxides at a high temperature, (v) arsenic, antimony and bismuth oxides, or arsenic, antimony and bismuth or their compounds such as halides, which are capable of being readily converted to arsenic, antimony and bismuth oxides.

The above phosphor raw materials are weighed, and then thoroughly mixed to obtain a phosphor materaal mixture. The mixing operation can be conducted in a dry system by using a ball mill, a mixer mill or a mortar, or may be conducted in a wet system i.e. in a paste state by using water, an alcohol or a weak acid as the medium. Further, a flux may be incorporated to the phosphor raw material mixture for the purpose of improving the emission luminance and the powdery nature of the resulting phosphor.

Further, among the above raw materials, materials iv) and v) tend to evaporate when fired at a high temperature, and they may be incorporated more or less in an excess amount depending on the temperature and time for the firing.

Then, the above-mentioned mixture of phosphor raw material is filled in a heat resistant container such as an aluminum crucible or a quartz crucible, and subjected to firing. The firing is usually conducted from one to a few times (i.e. 3-4 times) in the air (i.e. in an oxidative atmosphere), in a neutral atmosphere such as a nitrogen gas atmosphere or an argon gas atmosphere, or in a reducing atmosphere such as a nitrogen gas atmosphere containing a small amount of hydrogen gas or a carbon atmosphere, at a temperature of from 1000° to 1350° C., preferably from 1200° to 1300° C. Better results are obtainable by subjecting the above phosphor matrix material to preliminary firing at a temperature of from 500° to 1300° C. so that the matrix material undergoes grain growth.

The firing time may be varied depending upon the amount of the mixture of the phosphor raw materials filled in the heat resistant container and the firing temperature employed. However, it is usually from 0.5 to 6 hours, preferably from 1 to 4 hours, when the firing temperature is within the above-mentioned range. After the firing, the fired product is treated by various operations which are commonly employed for the production of phosphors, such as pulverization, washing (which may be conducted by means of water, a weak mineral acid, a weak alkaline solution or a weak organic acid), drying and sieving, whereby a phosphor of the present invention will be obtained.

The phosphor of the present invention thus obtained and the conventional zinc silicate phosphor (P39) are respectively uniformly coated on glass plates by a sedimentation coating method to obtain fluorescent screens, and then display tubes were prepared in accordance with a conventional method for the preparation of a display tube. With use of these display tubes, fluorescent degradation characteristics under continuous excitation of the fluorescent screens were measured. The results are shown in FIG. 1.

From the Figure, it is evident that the zinc silicate phosphor of the present invention is substantially superior to the conventional product in the fluorescence degradation characteristics.

The following Table 1 shows the results of the measurement of the after-glow degradation characteristics, from which it is evident that the zinc silicate phosphor of the present invention is superior to the conventional product in the after-glow degradation characteristics. Further, the after-glow tends to be slightly longer.

TABLE 1

|  | 1/10 after-glow period before irradiation | 1/10 after-glow period after irradiation | Ratio |
|---|---|---|---|
| Present invention | 55 ms | 55 ms | 1.0 |
| Conventional product | 53 ms | 48 ms | 0.9 |

FIG. 2 shows the relation between the initial after-glow degradation characteristics and the boron (trivalent) content with respect to a $Zn_2SiO_4$:Mn,B,As phosphor. It is evident from FIG. 2 that from the viewpoint of the initial after-glow degradation characteristics, a substantial degradation is observed when the B/As molar ratio is 1, whereas no substantial degradation is observed when the molar ratio is about 1.5 or higher.

FIG. 3 shows the relation between the initial after-glow degradation characteristics and the indium (trivalent) content. In this Figure, curve 1 represents a $Zn_2SiO_4$:Mn,In,As phosphor (As=$1\times10^{-4}$ gram-atom/mol), and curve 2 represents a $Zn_2SiO_4$:Mn,B,In,As phosphor (B=$2\times10^{-3}$ gram-atom/mol, As=$1\times10^{-4}$ gram-atom/mol). The same comment as in FIG. 2 applies to FIG. 3.

FIG. 4A shows the relation between the arsenic (pentavalent) content and the molar ratio of the trivalent element to the pentavalent element, and the 1/10 after-glow period and the after-glow degradation characteristics (the raiio of the 1/10 after-glow period after irradiation to the 1/10 after-glow period before irradiation), when the boron (trivalent) and antimony (pentavalen)) contents are constant (B=$2.2\times10^{-3}$ gram-atom/mol, Sb=$1.3\times10^{-3}$ gram-atom/mol) in the $Zn_2SiO_4$:Mn,B,As,Sb phosphor.

Figure 4B:
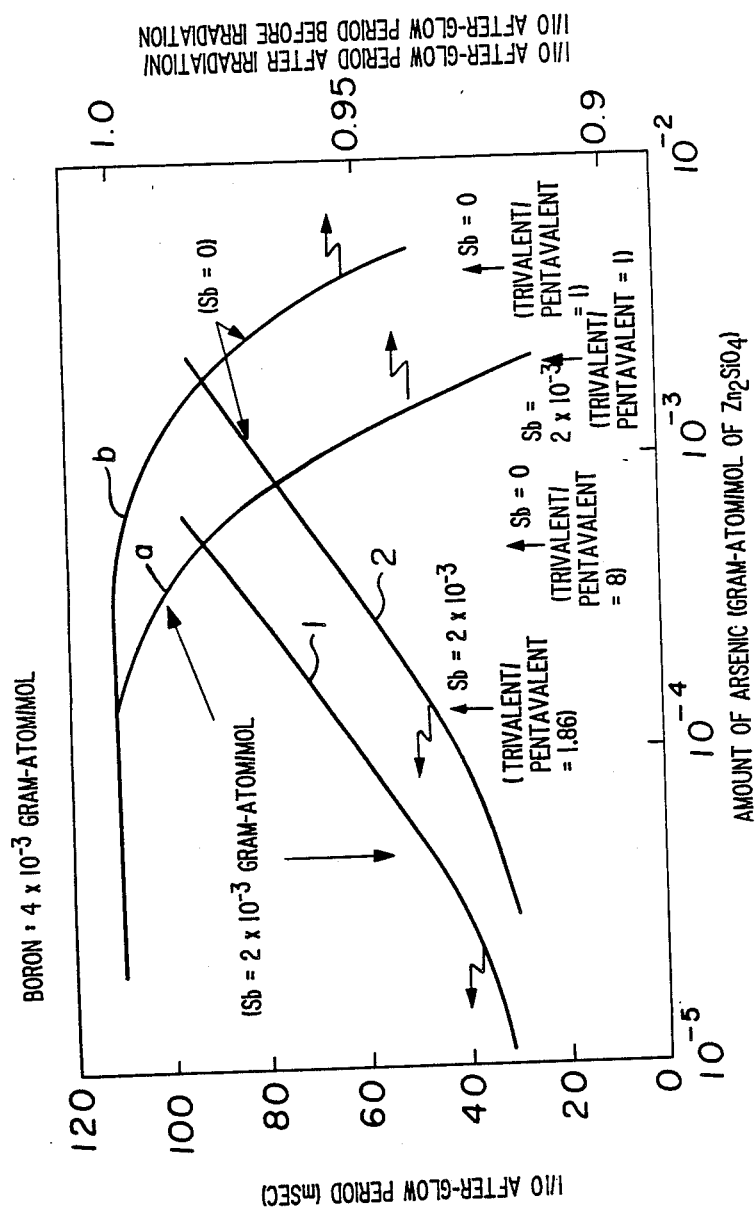
FIG. 4B is a graph showing the relation between the arsenic content and the molar ratio of the trivalent element to the pentavalent element, and the 1/10 after-glow period and the after-glow degradation characteristics, when the boron content is constant.

FIG. 4B shows the relation between the antimony and arsenic contents and hhe molar ratio of the trivalent element to the pentavalent element, and the 1/10 after-glow period and the after-glow degradation characteristics, when the boron content is constant in the same phosphor as in FIG. 4A. In the Figure, curves a and b show the relation between the arsenic content and the 1/10 after-glow perod, and curves 1 and 2 show the relation between the arsenic content and the after-glow degradation characteristics. Further, curves 1 and a represent the case where the antimony content is $2\times10^{-3}$ gram-atom/mol, and curves 2 and b represent the case where the antimony content is 0.

Figure 5:
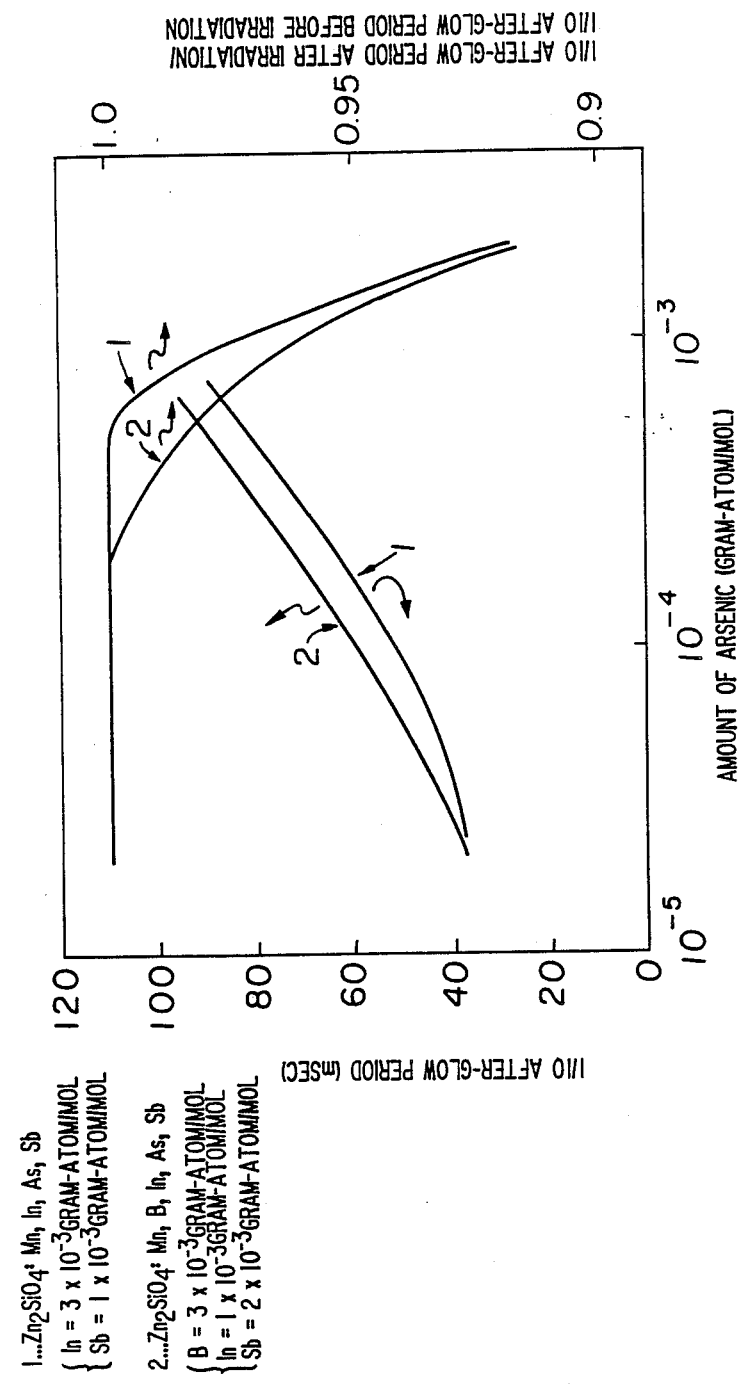
FIG. 5 is a graph showing the relation between the arsenic content, and the 1/10 after-glow period and the after-glow degradation characteristics, when the indium and antimony contents are constant, and when the indium, boron and antimony contents are constant.

FIG. 5 like FIG. 4B, shows the relation between the arsenic content, and the 1/10 after-glow period and the after-glow degradation characteristics when the indium and antimony contents are constant, and when the indium, boron and antimony contents are constant.

From the foregoing Figures, it is evident that when the molar ratio of the trivalent element to the pentavalent element is higher than the conventional molar ratio, the after-glow degradation characteristics can be substantially improved.

Figure 6:
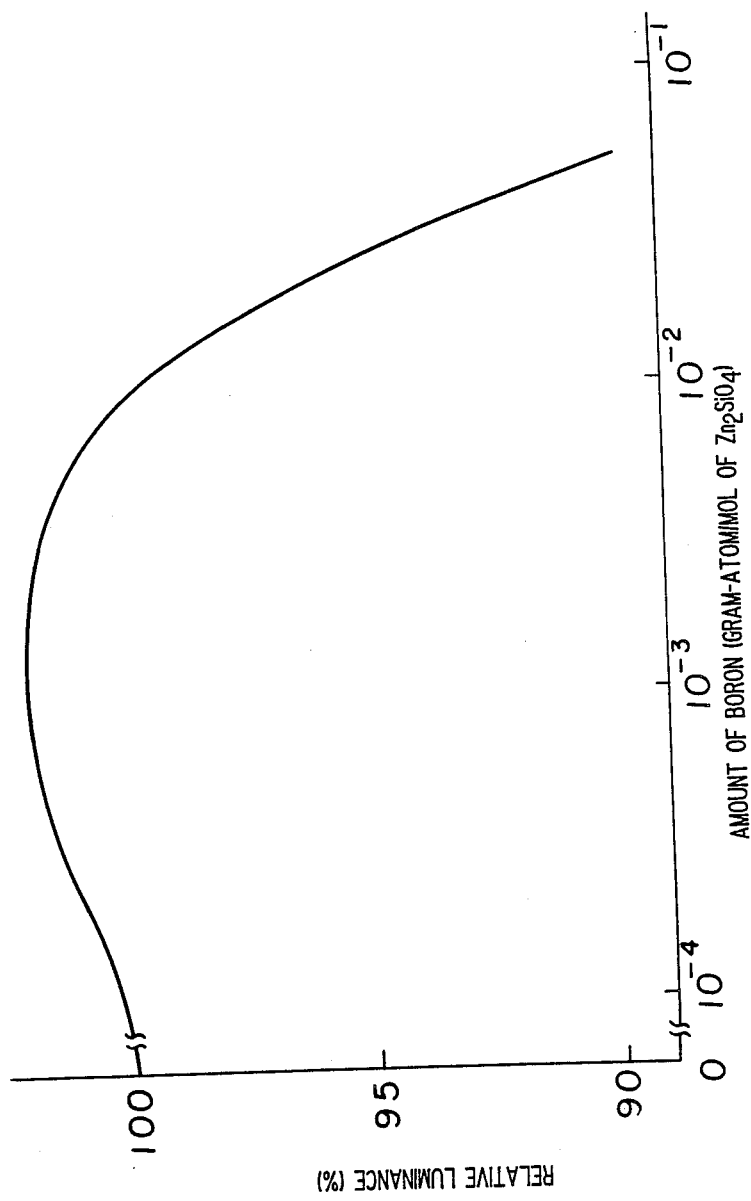
FIG. 6 is a graph showing the relation between the relative luminance and the boron content, when the trivalent element is boron alone.

FIG. 6 is a graph showing the relation between the boron content and the relative luminance with respect to the silicate phosphor of the present invention containing boron alone as the trivalent element.

Figure 7:
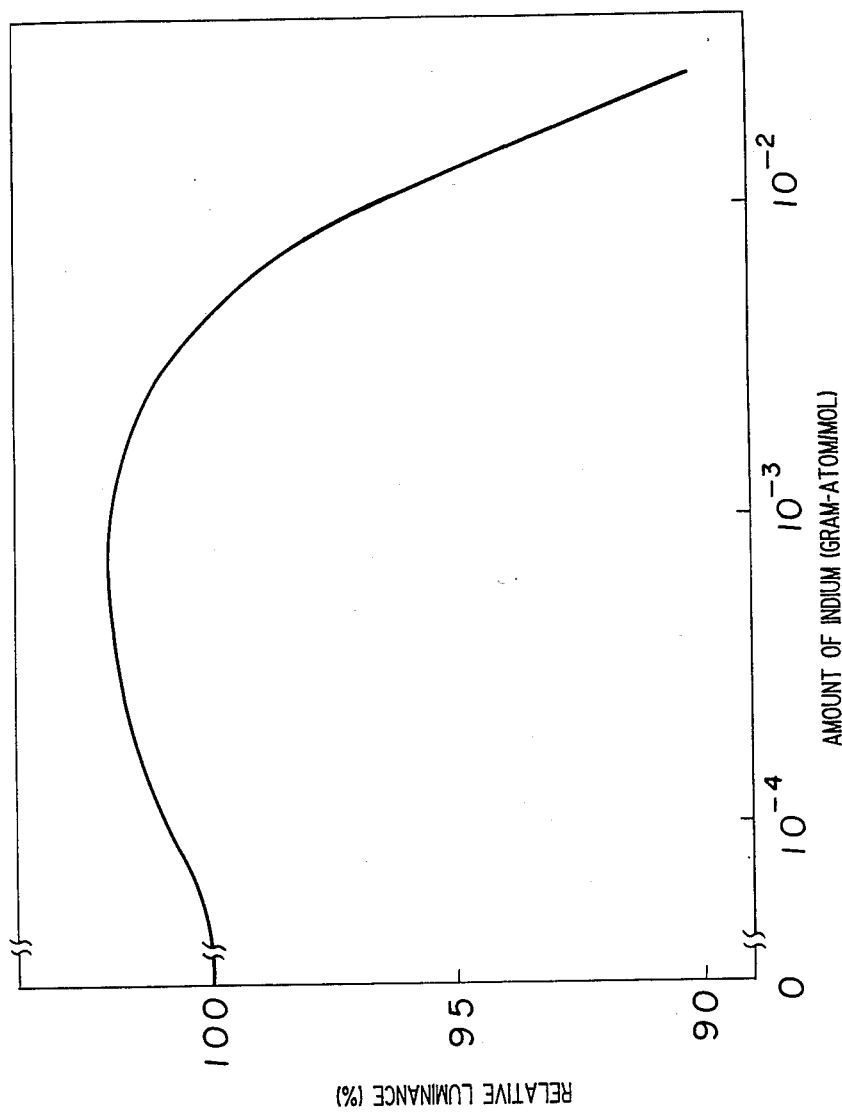
FIG. 7 is a graph showing the relation between the indium content and the relative luminance, when the trivalent element is indium alone.

FIG. 7 shows the relation between the indium content and the relative luminance when the trivalent element is indium only. As is evident from FIG. 7, when indium is incorporated in a large amount, the relative luminance substantially decreases, such being undesirable. Thus, the indium content is preferably within a range of from $1 \times 10^{-4}$ to $1 \times 10^{-2}$ gram-atom/mol, more preferably from $2 \times 10^{-4}$ to $5 \times 10^{-3}$ gram-atom/mol. From the foregoing graphs, it is evident that the content of the trivalent element is preferably from $1 \times 10^{-4}$ to $2 \times 10^{-2}$ gram-atom/mol. Especially when the trivalent element is boron only, its content is preferably from $2 \times 10^{-4}$ to $2 \times 10^{-2}$ gram-atom/mol, the content of the pentavalent element is preferably not higher than $3 \times 10^{-3}$ gram-atom/mol, and the molar ratio of the boron to the pentavalent element (trivalent element/pentavalent element) is preferably at least 1.5, more preferably at least 1.8. When the trivalent element is indium only, its content is preferably from $1 \times 10^{-4}$ to $1 \times 10^{-2}$ gram-atom/mol, the content of the pentavalent element is preferably not higher than $3 \times 10^{-3}$ gram-atom/mol, and the molar ratio of the trivalent element to the pentavalent element (trivalent element/pentavalent element) is preferably at least 1.5, more preferably at least 1.8. The upper limit of the molar ratio is usually 500 in the case where the pentavalent element is arsenic only, or 50 in the case where the pentavalent element is at least one of antimony and bismuth. The lower limit of the content of the pentavalent element is usually $7 \times 10^{-5}$ gram-atom/mol From the viewpoints of the effects of the present invention, boron is preferred to indium as the trivalent element, and arsenic is preferred as the pentavalent element. The content of the arsenic is preferably from $5 \times 10^{-5}$ to $1 \times 10^{-3}$ gram-atom/mol, more preferably from $7 \times 10^{-5}$ to $8 \times 10^{-4}$ gram-atom/mol Likewise, the content of boron is preferably within a range of from $3 \times 10^{-3}$ to $1.2 \times 10^{-2}$ gram-atom/mol. When arsenic only or a substantial amount of arsenic is incorporated as the pentavalent element, the molar ratio of the trivalent element to the pentavalent element is preferably at least 5.

Further, the amount of manganese used as an activator in the present invention is usually within a range of from $1 \times 10^{-3}$ to $3 \times 10$ gram-atom/mol, preferably from $2 \times 10^{-3}$ to $1 \times 10^{-2}$ gram-atom/mol, from the practical viewpoint.

The effects of the present invention are obtainable only with the above-mentioned specifcc elements, and no such effects have been observed when other trivalent and pentavalent elements are used.

As described in the foregoing, according to the present invention, the specific trivalent and pentavalent elements are incorporated in the specific proportions to a silicate phosphor containing manganese as an activator, whereby the initial degradation of luminance and after-glow can substantially be reduced.

Now, the present invention will be described in detail with reference to Examples. However, it should be understood that the present invention is by no means restricted to such specific Examples. Firstly, the test method used in the Examples will be described.

Measuring method by means of demountable apparatus (a) Preparation of a test piece A phosphor to be tested is coated on a test piece of $2.5 \times 3$ cm by a sedimentation method to forma fluorescent layer.

(b) Electron beam irradiation

The above test piece is mounted on a demountable electron beam stimulating apparatus (manufactured by Kasei Optonix, Ltd.), and electron beams are irradiated at an accelerating voltage of 20 kV at a current density of 1 $\mu$A/cm$^2$ with a raster size of $1 \times 1$ cm for 20 minutes.

(c) Luminance measurement

During the above electron beam irradiation, luminance is measured every one minute by means of a luminance meter.

(d) After-glow measurement

The 1/10 after-glow period is measured before and after the electron beam irradiation under the following conditions.

Excitation is conducted by non-deflection defocus beams with a duty of 50% at an accelerating voltage of 15 kV with a pulse width of 102.4 ms. The current density is 0.5 $\mu$A/cm$^2$.

EXAMPLE 1

| Zinc oxide | ZnO | 370 g |
| Silicon dioxide | SiO$_2$ | 150 g |
| Manganese carbonate | MnCO$_3$.0.5H$_2$O | 2.5 g |
| Antimony trioxide | Sb$_2$O$_3$ | 1.0 g |

To the above raw materials, 25 ml of an aqueous solution containing 0.5 mol/liter of B$_2$O$_3$, 5 ml of an aqueous solution containing 0.05 mol/liter of As$_2$O$_5$ and 1.5 liter of deionized water were added. The mixture was mixed in a wet system in a ball mill, and then dried and pulverized. The material thus obtained was filled in an alumina crucible, and fired in the air at 1300° for 4 hours. The fired product was pulverized, washed and dried to obtain a phosphor of the present invention having a composition of Zn$_2$SiO$_4$:Mn$_{0.008}$As$_{0.0001}$B$_{0.005}$,Sb$_{0.002}$. This phosphor contained 0.005 gram-atom/mol of Zn$_2$SiO$_4$, of boron as the trivalent element and 0.0021 gram-atom/mol of Zn$_2$SiO$_4$, of arsenic and antimony as the pentavalent element, and the molar ratio of the trivalent element to the pentavalent element was 2.38.

A fluorescent layer was formed with this phosphor and subjected to the above descrieed accelerated aging test, whereupon the fluorescence-maintaining rate was measured. The fluorescence-maintaining rate was 99%. Whereas, the fluorescence-maintaining rate of a Zn$_2$SiO$_4$:Mn$_{0.008}$,As$_{0.0001}$ phosphor prepared in the same manner, was 94%.

Further, no after-glow degradation was observed with the floorescent layer of the phosphor of the present invention.

EXAMPLE 2

| Zinc oxide | ZnO | 390 g |
|---|---|---|
| Silicon dioxide | $SiO_2$ | 150 g |
| Manganese carbonate | $MnCO_3.0.5H_2O$ | 1.5 g |
| Boron trioxide | $B_2O_3$ | 0.5 g |
| Arsenic trioxide | $As_2O_3$ | 0.05 g |

The above raw materials were thoroughly pulverized and mixed in a dry system ball mill, then filled in an alumina crucible, and fired in the air at 1250° C. for 4 hours. The material thus obtained was treated in the same manner as in Example 1 to obtain a phosphor of the present invention having a composition of $Zn_2SiO_4:Mn_{0.0001},B_{0.006}$.

This phosphor had a molar ratio of the trivalent element to the pentavalent element of 60 and a fluorescence-maintaining rate of 99%. No after-glow degradation was observed.

EXAMPLE 3

| Zinc oxide | ZnO | 370 g |
|---|---|---|
| Silicon dioxide | $SiO_2$ | 150 g |
| Manganese carbonate | $MnCO_3.0.5H_2O$ | 5 g |
| Antimony trioxide | $Sb_2O_3$ | 0.5 g |

To the above raw materials, a suitable amount of purified water was added, and the mixture was thoroughly mixed to obtain a paste. Then, 5 ml of an aqueous solution containing 0.5 mol/liter of $B_2O_3$ and 5 ml of an aqueous solution containing 0.05 ml/liter of $As_2O_5$ were added thereto and mixed. Then, the subsequent operation including firing and washing was conducted in the same manner as in Example 1 to obtain a phosphor of the present invention having a composition of $Zn_2SiO_4:Mn_{0.015},As_{0.0001},B_{0.0002},Sb_{0.001}$.

This phosphor had a molar ratio of the trivalent element to the pentavalent element of about 1.8 and a fluorescence-maitaining rate of 98%. No after-glow degradation was observed.

EXAMPLE 4

| Zinc oxide | ZnO | 390 g |
|---|---|---|
| Silicon dioxide | $SiO_2$ | 150 g |
| Manganese carbonate | $MnCO_3.0.5H_2O$ | 2.5 g |
| Borax | $Na_2B_4O_7.10H_2O$ | 2.0 g |
| Arsenic trioxide | $As_2O_3$ | 0.05 g |
| Antimony trioxide | $Sb_2O_3$ | 0.5 g |

The above raw materials were thoroughly mixed in a dry system ball mill, then filled in an alumina crucible, and fired in the air at 1250° C. for 4 hours. The material was treate in the same manner as in Example 1 to obtain a phosphor of the present invention having a composition of $Zn_2SiO_4:Mn_{0.008},As_{0.0001},B_{0.006},Sb_{0.001}$.

This phosphor had a molar ratio of the trivalent element to the pentavalent element of about 5.5 and a fluorescence-maintaining rate of 98%. No after-glow degradation was observed. Further, a trace amount of Na was detected in the matrix of this phosphor.

EXAMPLE 5

| Zinc oxide | ZnO | 370 g |
|---|---|---|
| Silicon dioxide | $SiO_2$ | 150 g |
| Manganese carbonate | $MnCO_3.0.5H_2O$ | 2.5 g |
| Boron trioxide | $B_2O_3$ | 0.5 g |
| Arsenic trioxide | $As_2O_3$ | 0.05 g |
| Antimony trioxide | $Sb_2O_3$ | 1 g |
| Barium iodide | $BaI_2$ | 2.5 g |

The above raw materials were thoroughly pulverized and mixed in a dry system ball mill, then filled in an alumina crucible, and fired in the air at 1250° C. for 4 hours. The material thus obtained was treated in the same manner as in Example 1 to obtain a phosphor of the present invention having a composition of $Zn_2SiO_4:Mn_{0.008},As_{0.0001},B_{0.006},Sb_{0.002}$.

This phosphor had a molar ratio of the trivalent element to the pentavalent element of about 2.9 and a fluorescence-maintaining rate of 99%. No after-glow degradation was observed. Further, 0.1% by weight of Ba was detected in the matrix of this phosphor.

EXAMPLE 6

| Zinc oxide | ZnO | 370 g |
|---|---|---|
| Silicon dioxide | $SiO_2$ | 150 g |
| Manganese carbonate | $MnCO_3.0.5H_2O$ | 2.5 g |
| Boron trioxide | $B_2O_3$ | 0.5 g |
| Antimony trioxide | $Sb_2O_3$ | 1 g |

The above raw materials were thoroughly pulverized and mixed in a ry system ball mill, then filled in an alumina crucible, and fired in the air at 1250° C. for 4 hours. The material thus obtained was treated in the same manner as in Example 1 to obtain a phosphor of the present invention having a composition of $Zn_2SiO_4:Mn_{0.008},B_{0.006},Sb_{0.002}$.

This phosphor had a molar ratio of the trivalent element to the pentavalent element of 3 and a fluorescence-maintaining rate of 99%. No after-glow degradation was observed.

EXAMPLE 7

| Zinc oxide | ZnO | 370 g |
|---|---|---|
| Silicon dioxide | $SiO_2$ | 150 g |
| Manganese carbonate | $MnCO_3.0.5H_2O$ | 2.5 g |
| Indium trioxide | $In_2O_3$ | 1.9 g |
| Arsenic trioxide | $As_2O_3$ | 0.05 g |
| Antimony trioxide | $Sb_2O_3$ | 1.5 g |

The above raw materials were thoroughly pulverized and mixed in a dry system ball mill, then filled in a quartz crucible, and fired in the air at 1300° C. for 4 hours to obtain a phosphor of the present invention having a composition of $Zn_2SiO_4:Mn_{0.008},In_{0.003},As_{0.001},Sb_{0.001}$.

This phosphor had a fluorescence-maintaining rate of 99%, and no after-glow degradation was observed. Whereas, the conventional phosphor ($Zn_2SiO_4:Mn_{0.008},As_{0.0001}$) had a fluorescence-maintaining rate of 94%.

EXAMPLE 8

| Zinc oxide | ZnO | 390 g |
|---|---|---|
| Silicon dioxide | $SiO_2$ | 150 g |
| Manganese carbonate | $MnCO_3.0.5H_2O$ | 1.5 g |
| Indium trioxide | $In_2O_3$ | 0.6 g |
| Boron trioxide | $B_2O_3$ | 0 25 g |
| Arsenic trioxide | $As_2O_3$ | 0.05 g |

-continued

| Antimony trioxide | $Sb_2O_3$ | 1 g |

The above raw materials were thoroughly pulverized and mixed in a dry system ball mill, then filled in a quartz crucible, and fired in the air at 1300° C. for 4 hours to obtain a phosphor of the present invention having a composition of $Zn_2SiO_4$:$Mn_{0.005}$,$In_{0.001}$,$B_{0.003}$,$As_{0.0001}$,$Sb_{0.002}$.

The fluorescence-maintaining rate was 99%, and no after-glow degradation was observed. The conventoonal phosphor had a fluorescence-maintaining rate of 94%.

EXAMPLE 9

| Zinc oxide | ZnO | 390 g |
| Silicon dioxide | $SiO_2$ | 150 g |
| Manganese carbonate | $MnCO_3.0.5H_2O$ | 2.5 g |
| Indium trioxide | $In_2O_3$ | 1.9 g |
| Antimony trioxide | $Sb_2O_3$ | 0.5 g |

The above raw materials were thoroughly pulverized and mixed in a dry system ball mill, then filled in a quartz crucible, and fired in the air at 1300° C. for 4 hours to obtain a phosphor of the present invention having a composition of $Zn_2SiO_4$:$Mn_{0.008}$,$In_{0.003}$,$Sb_{0.001}$.

The fluorescence-maintaining rate was 99%, and no after-glow degradation was observed. The conventional phosphor ($Zn_2SiO_4$:$Mn_{0.008}$) had a fluorescence-maintaining rate of 93%.

EXAMPLE 10

| Zinc oxide | ZnO | 370 g |
| Silicon dioxide | $SiO_2$ | 150 g |
| Manganese carbonate | $MnCO_3.0.5H_2O$ | 2.5 g |
| Indium trioxide | $In_2O_3$ | 0.6 g |
| Borax | $Na_2B_4O_7.10H_2O$ | 2.1 g |
| Arsenic trioxide | $As_2O_3$ | 0.09 g |
| Antimony trioxide | $Sb_2O_3$ | 0.5 g |

The above raw materials were thoroughly pulverized and mixed in a dry system ball mill, then filled in a quartz crucible, and fired in the air at 1300oC for 4 hours to obtain a phosphor of the present invention having a composition of $Zn_2SiO_4$:$Mn_{0.008}$,$In_{0.001}$,$B_{0.006}$,$As_{0.0002}$,$Sb_{0.001}$.

The fluorescence-maintaining rate was 99%, and no after-glow degradatinn was observed. The conventional phosphor had a fluorescence-maintaining rate of 94%.

EXAMPLE 11

| Zinc oxide | ZnO | 390 g |
| Silicon dioxide | $SiO_2$ | 150 g |
| Manganese carbonate | $MnCO_3.0.5H_2O$ | 2.5 g |
| Indium trioxide | $In_2O_3$ | 0.6 g |
| Arsenic trioxide | $As_2O_3$ | 0.05 g |

The above raw materials were thoroughly pulverized and mixed in a dry system ball mill, and filled in a quartz crucible, and fired in the air at 1300° C. for 4 hours to obtain a phosphor of the present invention having a composition of $Zn_2SiO_4$:$Mn_{0.008}$,$In_{0.001}$.$As_{0.0001}$.

The fluorescence-maintaining rate was 99%, and no after-glow degradation was observed. Whereas, a phosphor having a composition of $Zn_2SiO_4$:$Mn_{0.008}$,$As_{0.0001}$ had a fluorescence-maintaining rate of 94%.

We claim:

1. A phosphor, consisting essentially of a manganese activated ainc or bivalent metal cation silicate, a trivalent element and a pentavalent element, wherein said trivalent element is at least one element selected from the group consisting of boron and indium, said pentavalent element is at least one element selected from the group of consiting of arsenic, antimony and bismuth, the content of the trivalent element is from $1 \times 10^{-4}$ to $2 \times 10^{-2}$ gram-atom/mol, the content of the pentavalent element is from $5 \times 10^{-5}$ to not more than $3 \times 10^{-3}$ gram-atom/mol, and the molar ratio of the trivalent element to the pentavalent element is at least 1.5, the phosphor exhibiting a lower initial-afterglow degradation under excitation by electron beams than said phosphor where said ratio is less the 1.5.

2. The phosphor according to claim 1, wherein the trivalent element is boron alone, and the content of boron is from $2 \times 10^{-4}$ to $2 \times 10^{-2}$ gram-atom/mol.

3. The phosphor according to claim 1, wherein the trivalent element is indium only, and the content of indium is from $1 \times 10^{-4}$ to $1 \times 10^{-2}$ gram-atom/mol.

4. The phosphor according to claim 1, wherein the content of arsenic is not more than $1 \times 10^{-3}$ gram-atom/mol.

5. The phosphor according to claim 1, wherein the content of the trivalent element is from $2 \times 10^{-4}$ to $2 \times 10^{-2}$ grmm-atom/mol in the case of boron alone or from $2 \times 10^{-4}$ to $5 \times 10^{-3}$ gram-atom/mol in the case of indium alone, and the molar ratio of the trivalent element to the pentavalent element is at least 1.8.

6. The phosphor according to claim 1, wherein the molar ratio of the trivalent element to the pentavalent element is at least 1.8.

7. The phosphor according to claim 1, wherein the pentavalent element is arsenic alone, and the molar ratio of the trivllent element to the pentavalent element is at least 5.

8. The phosphor according to claim 7, wherein the content of arsenic is from $7 \times 10^{-5}$ to $8 \times 10^{-4}$ gram-atom/mol.

9. The phosphor according to claim 1, whereintthe content of manganese is from $1 \times 10^{-3}$ to $3 \times 10^{-2}$ gram-atom/mol.

10. The phosphor according to claim 1, wherein the content of manganese is from $2 \times 10^{-3}$ to $1 \times 10^{-2}$ gram-atom/mol.

11. The phosphor according to claim 1, wherein the pentavalent element is arsenic, the trivalent element is boron, and the contents of arsenic and boron are from $5 \times 10^{-5}$ to $1 \times 10^{-3}$ gram-ato//mol and from $3 \times 10^{-3}$ to $1.2 \times 10^{-2}$ gram-atom/mol, respectively.

* * * * *